United States Patent
Curtis et al.

(10) Patent No.: US 6,826,750 B1
(45) Date of Patent: Nov. 30, 2004

(54) METHOD OF AUTOMATICALLY SELECTING PROGRAM AND DATA UPDATES BASED UPON VERSIONS

(75) Inventors: Bryce Allen Curtis, Round Rock, TX (US); Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/533,303

(22) Filed: Mar. 23, 2000

(51) Int. Cl.$^7$ .............................................. G06F 9/44
(52) U.S. Cl. ...................................................... 717/170
(58) Field of Search ........................ 717/108, 168–178; 707/103 R, 200, 203; 209/202–203, 219

(56) References Cited

U.S. PATENT DOCUMENTS

| | | | |
|---|---|---|---|
| 5,047,918 A | 9/1991 | Schwartz et al. | 707/203 |
| 5,388,255 A | 2/1995 | Pytlik et al. | 707/4 |
| 5,499,357 A | * 3/1996 | Sonty et al. | 710/104 |
| 5,600,834 A | 2/1997 | Howard | 707/201 |
| 5,668,992 A | 9/1997 | Hammer et al. | 713/1 |
| 5,729,761 A | 3/1998 | Murata et al. | 710/14 |
| 5,740,359 A | 4/1998 | Hasegawa et al. | 714/47 |
| 5,752,042 A | 5/1998 | Cole et al. | 717/173 |
| 5,878,256 A | 3/1999 | Bealkowski et al. | 713/2 |
| 5,923,885 A | 7/1999 | Johnson et al. | 717/176 |
| 5,960,204 A | 9/1999 | Yinger et al. | 710/104 |
| 5,974,428 A | 10/1999 | Gerard et al. | 707/203 |
| 5,978,585 A | 11/1999 | Crelier | 717/145 |
| 6,415,435 B1 | * 7/2002 | McIntyre | 717/108 |

* cited by examiner

Primary Examiner—Kakali Chaki
Assistant Examiner—Lawrence Shrader
(74) Attorney, Agent, or Firm—Duke W. Yee; Jeffrey S. LaBaw; Francis Lammes

(57) ABSTRACT

A method, system and apparatus for loading the correct version of a file in a system in which multiple versions of the same file and multiple versions of a requesting application reside. In a preferred embodiment, a class loader receives a request, from a requesting application, to load a file. The request includes an indication of the current version of the requesting application. The class loader retrieves from a plurality of files, the one version of the requested file that is compatible with the requesting application and then loads that file. Each of the plurality of files includes an indication of plurality of versions for which the particular file is compatible and the version of the requesting application is within the plurality of versions for which the selected file is compatible.

42 Claims, 4 Drawing Sheets

METHOD OF AUTOMATICALLY SELECTING PROGRAM AND DATA UPDATES BASED UPON VERSIONS

BACKGROUND OF THE INVENTION

1. Technical Field

The present invention relates generally to the field of computer software and, more particularly, to methods and systems for selecting classes and data files to store multiple versions of application software in order to avoid unnecessary duplication of classes and files between multiple versions of the same application software.

2. Description of Related Art

The JAVA computer programming language is an object-oriented language. JAVA is a trademark of Sun Microsystems, Inc. C++ is another of an object-oriented language. In these types of programming languages, an object is a set of data and methods that operate on that data. To use objects in an application or program, a programmer need only know what the objects do an not how they do it. The data and the details of implementation of the methods are hidden from the users. They are "encapsulated" in the object.

A class is a template for creating objects. From a class, one can create (instantiate) any number of objects, each of which will have its own data and an identical set of methods that apply to the data. The instantiation of an object from a class is accomplished by using the constructor method of the class to set the initial values of the data. A class may have several constructors, with different numbers and data types for the parameters passed to the constructor. The identifier of any constructor method is the same as the identifier of the class.

New classes can be created by extending existing classes. Such a new class then inherits all the methods and data field from the base (or parent) class. Data fields and methods can be added and existing methods changed (overridden).

Object-oriented programming makes it convenient to reuse existing classes either to create objects or to produce new classes. JAVA has a library of classes which can be used to produce programs from off-the-shelf (already created and stored in a class library) components.

Software applications written in object programming languages, such as JAVA, may include multiple classes. The classes contained within an application often change when a new release or updated version of the application is created. Many times, however, only a small number of the classes change. The changes in the classes between releases of an application may be made for different reasons. For example, the change may be to add new features to the software application or to fix problems associated with previous releases of the software application. One potential pitfall of making changes is that a new class may no longer be compatible with older classes.

When multiple software versions of an application are installed on one system, the correct set of classes must be used for the specified version. One solution is to install each version in its own directory. However, if only a small number of classes or files have changed, this solution is very inefficient. Also, this situation means that the two separate installations may not share the same application data, user preferences, etc. Therefore, a method and system that provides a more efficient means of storing and utilizing different versions of an application on a single system is desirable.

SUMMARY OF THE INVENTION

The present invention provides a method, system and apparatus for loading the correct version of a file in a system in which multiple versions of the same file and multiple versions of a requesting application reside. In a preferred embodiment, a class loader receives a request, from a requesting application, to load a file. The request includes an indication of the current version of the requesting application. The class loader retrieves from a plurality of files, the one version of the requested file that is compatible with the requesting application and then loads that version of the file. Each of the plurality of files includes an indication of a plurality of versions for which the particular file is compatible. The plurality of versions for which the version of the requested file that is selected is compatible includes the version of the requesting application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
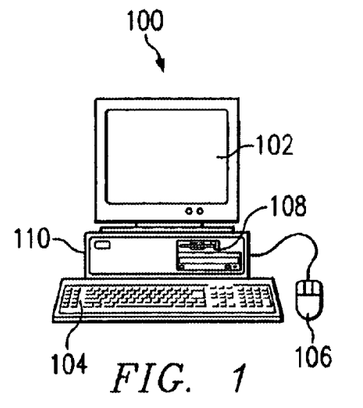
FIG. 1 depicts a pictorial representation illustrating a data processing system in which the present invention may be implemented in accordance with a preferred embodiment of the present invention.

With reference now to the figures and, in particular, with reference to FIG. 1, a pictorial representation illustrating a data processing system in which the present invention may be implemented is depicted in accordance with a preferred embodiment of the present invention. A personal computer 100 is depicted which includes a system unit 110, a video display terminal 102, a keyboard 104, storage devices 108, which may include floppy drives and other types of permanent and removable storage media, and a pointing device 106, such as a mouse. Additional input devices may be included with personal computer 100, as will be readily apparent to those of ordinary skill in the art.

The personal computer 100 can be implemented using any suitable computer. Although the depicted representation shows a personal computer, other embodiments of the present invention may be implemented in other types of data processing systems, such as mainframes, workstations, network computers, Internet appliances, palm computers, etc.

The system unit 110 comprises memory, a central processing unit, one or more I/O units, and the like. However, in the present invention, the system unit 110 preferably contains a speculative processor, either as the central processing unit (CPU) or as one of multiple CRPUs present in the system unit.

Figure 2:
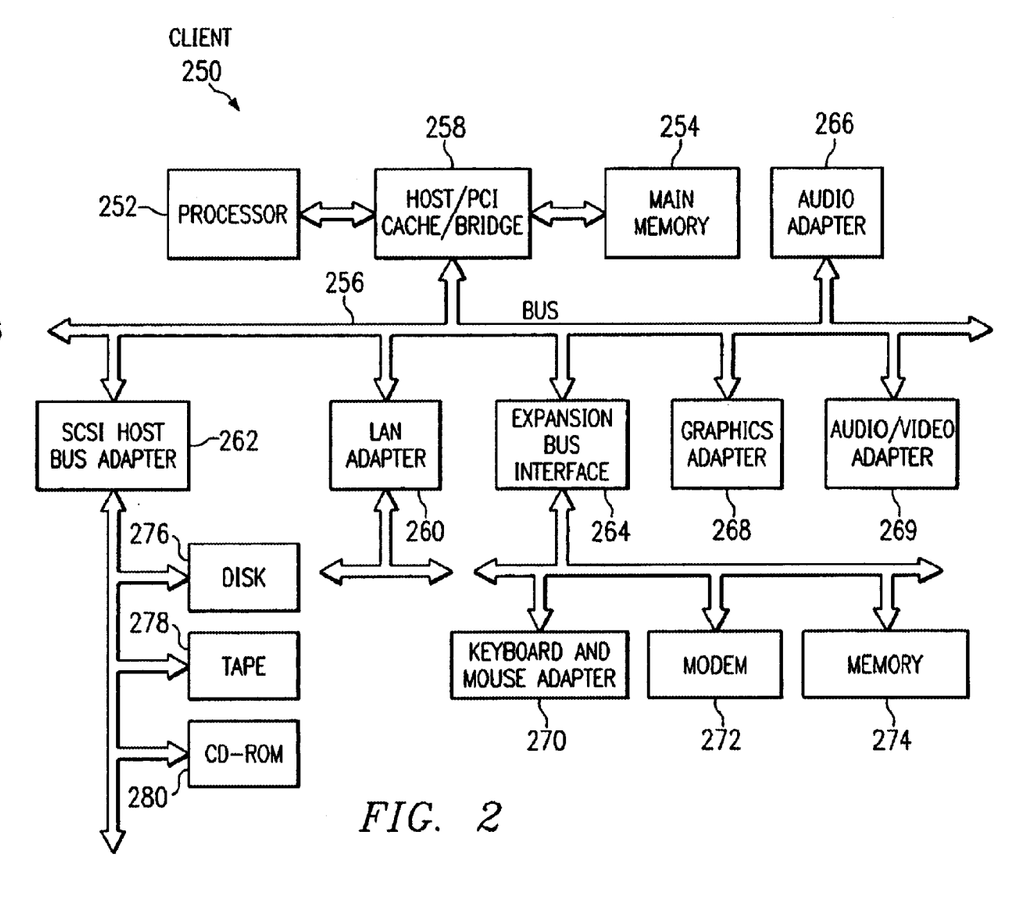
FIG. 2 depicts a block diagram of a data processing system in which the present invention may be implemented.

With reference now to FIG. 2, a block diagram of a data processing system in which the present invention may be implemented is illustrated. Data processing system 250 is an example of a computer, such as, for example, personal computer 100 in FIG. 1. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 256 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2. The operating system may be a commercially available operating system such as JavaOS For Business™ or OS/2™, which are available from International Business Machines Corporation™. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2 may vary depending on the implementation. For example, other peripheral devices, such as optical disk drives and the like may be used in addition to or in place of the hardware depicted in FIG. 2. The depicted example is not meant to imply architectural limitations with respect to the present invention. For example, the processes of the present invention may be applied to a multiprocessor data processing system.

The present invention provides a process and system for enabling multiple versions of an application to be efficiently installed and used on a computer. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3A:
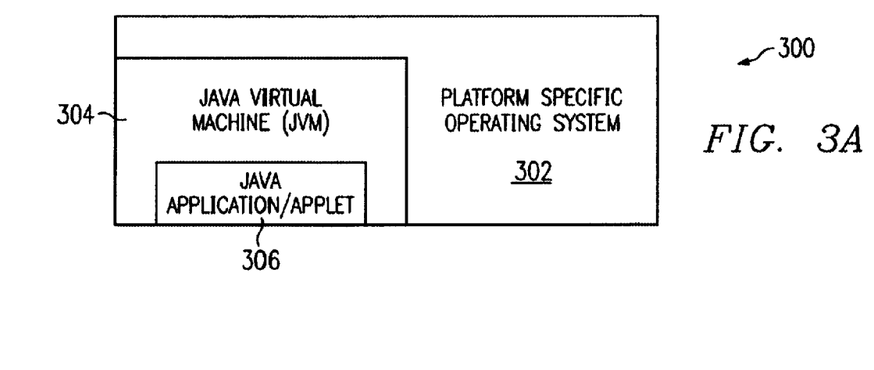
FIG. 3A depicts a block diagram illustrating the relationship of software components operating within a computer system that may implement the present invention.

With reference now to FIG. 3A, a block diagram illustrates the relationship of software components operating within a computer system that may implement the present invention. JAVA-based system 300 contains platform specific operating system 302 that provides hardware and system support to software executing on a specific hardware platform. JVM 304 is one software application that may execute in conjunction with the operating system. JVM 304 provides a JAVA run-time environment with the ability to execute JAVA application or applet 306, which is a program, servlet, or software component written in the JAVA programming language. The computer system in which JVM 304 operates may be similar to data processing system 250 or computer 100 described above. However, JVM 304 may be implemented in dedicated hardware on a so-called JAVA chip, JAVA-on-silicon, or JAVA proessor with an embedded pico JAVA core.

JVM is the center of a JAVA run-time environment and supports all aspects of JAVA's environment, including its architecture, security features, mobility across networks, and platform independence.

JVM 304 is a virtual computer that executes JAVA programs. JAV 304 is in essence a computer that is specified abstractly. The specification defines certain features that every JVM must implement, with some range of design choices that may depend upon the platform on which the JVM is designed to execute. For example, all JVMs must execute JAVA bytecodes and may use a range of techniques to execute the instructions represented by the bytecodes. A JVM may be implemented completely in software or somewhat in hardware. This flexibility allows different JVMs to be designed for mainframe computers and PDAs.

JAVA programs are not run directly by the central processor but instead by the JVM, which is itself a piece of software running on the processor. The JVM allows JAVA programs to be executed on a different plateform as opposed to only the one platform for which the code was complied. JAVA programs are compiled for the JVM. In this manner, JAVA is able to support applications for many types of data processing systems, which may contain a variety of central processing units and operating systems architectures. To enable a JAVA application to execute on different types of data processing systems, a compiler typically generates bytecode instructions, which are in an architecture-neutral file format. A "bytecode" instruction is a machine independent code generated by the JAVA compiler and executed by a JAVA interpreter. A JAVA interpreter is part of the JVM that alternately docodes and interprets a bytecode or bytecodes. These bytecode instructions are designed to be easy to interpret on any computer and easily translated on the fly into native machine code. Bytecodes also may be translated into native code, computer specific instructions, by a just-in-time compiler (JIT).

Figure 3B:
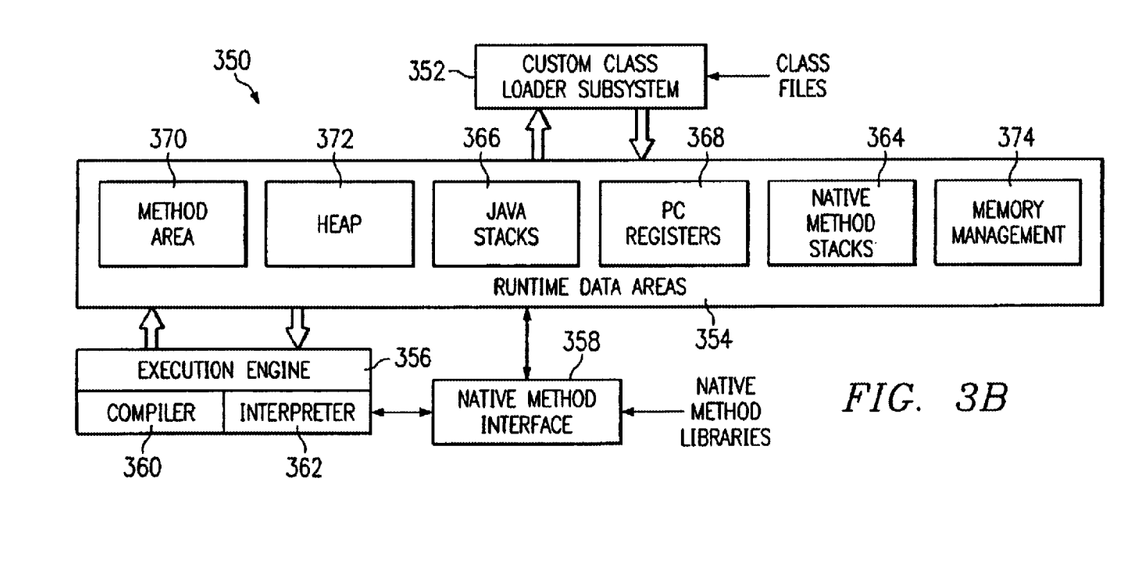
FIG. 3B depicts a block diagram of a JVM in accordance with a preferred embodiment of the present invention.

With reference now to FIG. 3B, a block diagram of a JVM is depicted in accordance with a preferred embodiment of the present invention. JVM 350 includes a custom class loader subsystem 352, which is a mechanism for loadeng types, such as classes and interfaces, given fullly qualified names just as a normal class loader does. However, custom class loader subsystem 352 also loads classes based on versions. Class loader 352 loads class files from an application and the class files from the JAVA application rogramming interfaces (APIs) which are needed by the application. More about custom class loader subsystem 352 will be described below. JVM 350 also contains runtime data areas 354, execution engine 356, native method inteface 358, and memory manaement 374.

Execution engine 356 is a mechanism for executing instructions in the methods of classes loaded by custom class loader subsystem 352. Execution engine 356 may be, in these examples, JAVA interpreter 362 or just-in-time 360. Native method interface 358 allows access to resources in the underlying operating system. Native method interface 358 may be, for example, a JAVA native interface.

Runtime data areas 354 contain native method stacks 364, JAVA stacks 366, PC regiters 368, method area 370, and heap 372. These different data areas represent the organization of memory needed by JVM 350 to execute a program.

JAVA stacks 366 are used to store the state of JAVA method invocations. When a new thread is launched, the JVM creates a new JAVA stack for the thread. The JVM performs only two operations directly on JAVA stacks: it pushes and pops frames, A thread's JAVA stack stores the state of JAVA method invocations for the thread. The state of a JAVA method invocation includes its local variables, the parameters with which it was invoked, its return value, if any, and intermediate calculations. JAVA stacks are composed of stack frames.

PC registers 368 are used to indicate the nex instruction to be executed. Each instantiated thread gets its own pc register (program couter) and JAVA stack. If the thread is executing a JVM method, the value o fhte pc register indicates the mext instruction to execute. If the thread is executing a native metheod, then the contents of the pc register are undefined.

Native method stacks 364 store the state of invocations of native methods. The state of native method ivocations is stored in an implementation-dependent way in native method stacks, registers, or other implementation-dependent memory areas. In some JVM implementations, native method stacks 364 are combined. contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory.

Memory management 374 in the depicted example manages memory space within the memory allocated to heap 370. Memory management 374 may include a garbage collector, which automatically reclaims memory used by objects that are no longer referenced. Additionally, a garbage collector also may move objects to reduce heap fragmentation.

The processes described with respect of the following figures provide an overall perspective of the many processes employed within the present invention. These processes include processes that dynamically select and load classes or data files based upon version information; processes that efficiently select the appropriate class or file from multiple versions for the currently executing JAVA application or class; processes that efficiently store classes and files, wherein each class or file has a version range associated with it; and processes that, when running software that is version-dependent, can check available classes or files against its current version and load appropriate ones.

Many times a class or file remains unchanged from one version to the next. Thus, to efficiently store classes and files, each class or file has a version range associated with it. This range is specified with a beginning and ending version number as described above. Based upon the currently executing version, the appropriate class or file is identified and loaded by JVM 350.

When running software that is version dependent, custom class loader 352 checks available classes or files agains its current version and loads an appropriate one. If the version is changed during the execution of the program, custom classloader 352 may load different JAVA classes or files.

Each class that is versionable implements ClassVersion. An example of ClassVersion is given below:
   public interface ClassVersion {
      //Current version of this class
      public static String VERSION="0200";
      //Earliest version that this class will work with
      public static String BEGIN_VERSION="0200";
      //Latest version that this class will work with
      //"9999" indicates all versions after BEGIN_VERSION
      public static String END_VERSION="9999";}

In the depicted example, the particular class version will work with version "0200" of the application and with all versions after version "0200."

Custom class loader 352 is configured to load a class that is compatible with a particular current version of the application calling the class. The class file name is referenced by "+xxxxyyyyzzzzclass_name", where "xxxx" is the current version, "yyyy" is the beginning version, "zzzz" is the ending version, and "class_name" is the name of the class being loaded. The "+" character is used to signify that this class file name includes the three version numbers.

The class file may reside in a directory, a jar file, or any other collection of class files. However, in the example described herein, the class file resides in a database. As an example, consider two versions of the ABC class. The two versions of the ABC class could be referenced as +013001100140ABC and +016001419999ABC respectively. In this example, the current version of class version +013001100140ABC is 0130, the beginning version of the calling application that this class will work with is 0110, and the ending version for which this class version will work is 0140. The current version of class version +016001419999ABC is 0160, the beginning version of the calling application for which this class version will work is 0141, and this class version will work with all versions of the calling application after 0141.

Figure 4:
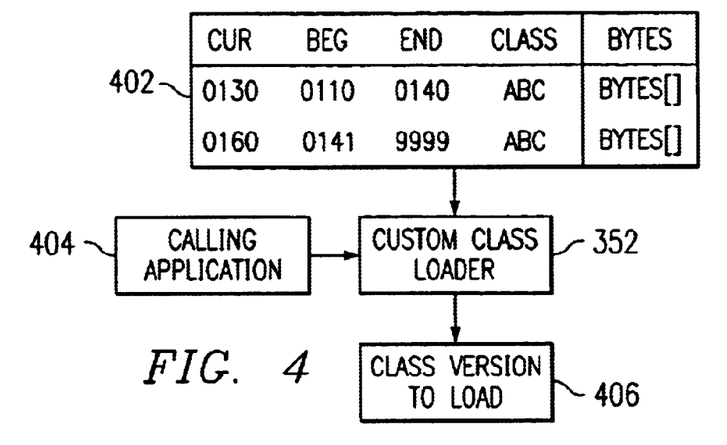
FIG. 4 depicts a block diagram illustrating selecting one of two class versions based on the current version of an application being run in accordance with the present invention.

Referring now to FIG. 4, a block diagram illustrating selecting one of the two class versions based on the current version being run is depicted in accordance with the present invention. These two classes are initially loaded into a hashtable 402 by custom class loader 352. In the depicted example, the two classes loaded into hashtable 402 are 013001100140ABC and 016001419999ABC. The custom class loader 352 determines the current version of the calling application 404 and compares that version against the versions loaded into hash table 402. Custom class loader 352 then returns the class version to load 406 into memory. For example, if the current version of the application 404 being run is 0170, then a comparison would be done, resulting in +016001419999ABC being returned as the class version to load 406 and loaded by custom class loader 352.

Figure 5:
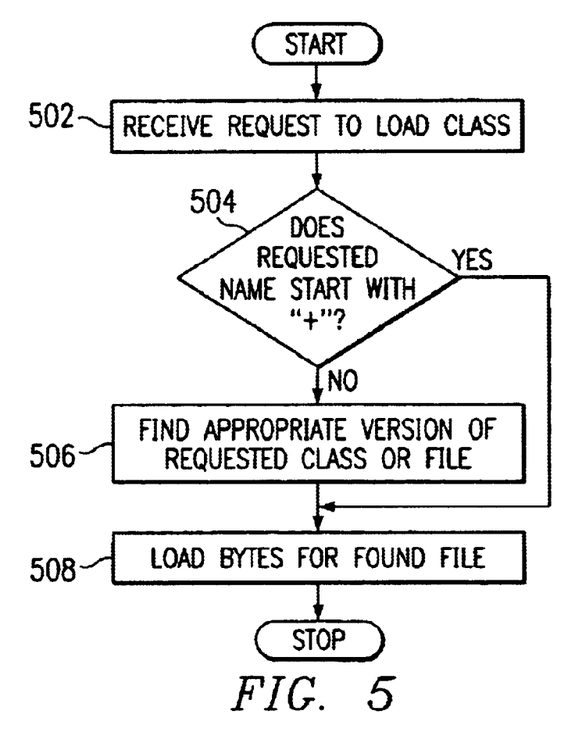
FIG. 5 depicts a flowchart illustrating a general overview of a method of determining and loading an appropriate version of a class file in accordance with the present invention.

Referring now to FIG. 5, a flowchart illustrating a general overview of a method of determining and loading an appropriate version of a class file is depicted in accordance with the present invention. Custom class loader 352 receives a request to load a class or file from a requesting application (step 502). The request also includes an indication of the version of the requesting application such that custom class loader 352 can load the appropriate version of the requested class or file. Custom class loader 352 then determines whether the name of the requested class or file begins with "+" (step 504). If the name of the requested class or file begins with "+", then the requesting application is requesting a particular version of the class and custom class loader 352 loads the bytes for the requested class or file (step 508). If the requested name does not begin with "+", then custom class loader 352 finds the appropriate version of the requested class or file using, for example, a hash table (step 506). Although the present example uses "+" as an indication that the class file includes the three version numbers, the indicator could be any other alpha-numeric or other code recognized by custom class loader 352. For example, the indicator could be a "%" symbol or a "&" symbol rather than the "30 " symbol. Custom class loader 352 then loads the bytes for the class or file found which matches the requested class or file and which is the appropriate version of the requested class or file (step 508).

Figure 6:
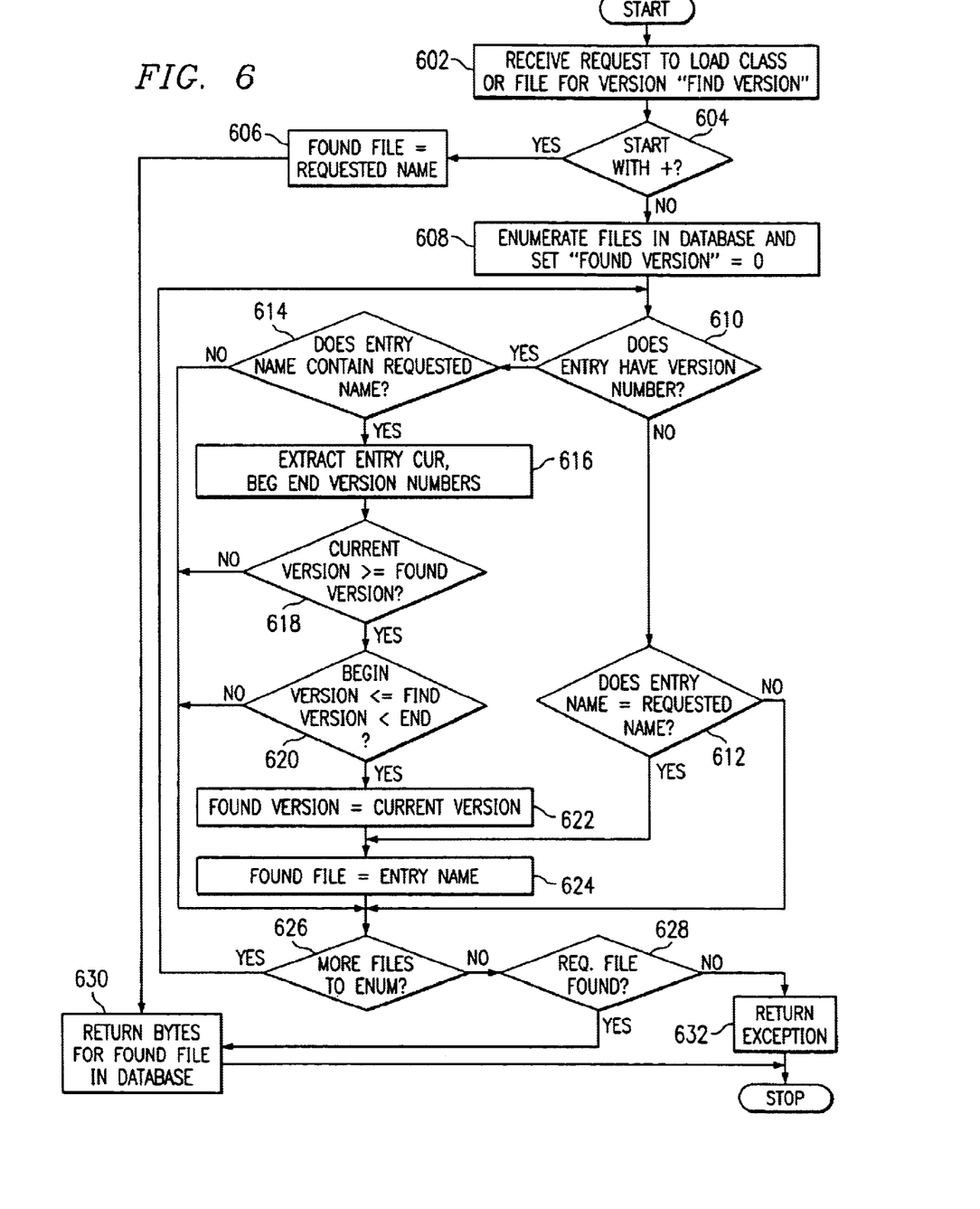
FIG. 6 depicts a more detailed flowchart illustrating a method of determining and loading an appropriate version of a class file in accordance with the present invention.

Referring now to FIG. 6, a more detailed flowchart illustrating a method of determining and loading an appropriate version of a class file is depicted in accordance with the present invention. To begin, a custom class loader, such as custom class loader 352 in FIG. 3, receives a request to load a class or file for a particular version of an application and assigns this version number to the variable "find version" (step 602). The custom class loader determines whether the requested file or class name received from the requesting application begins with the "+" character (step 604). If the requested file or class name does begins with the "+" character, then set the variable "found file" equal to the requested name (step 606). This is because the requested file or class name will have the form "+xxxxyyyyzzzzclass_name." Next locate the file in the database having the "found file" name and return the bytes for the "found file" in the database to the requesting application (step 630).

If the requested file or class name does not begin with the "+" character, then enumerate the files in the database and set the variable "found version" equal to 0 (step 608). Next, the custom class loader determines whether the entry in the database has a version number with which it is associated (step 610). If the entry does not have a version number with which it is associated, then the custom class loader determines whether the entry name is equivalent to the requested name (step 612). If the entry name is not equivalent to the requested name, then the custom class loader proceeds to step 626. If the entry name is equivalent to the requested name, then the custom class loader sets the variable "found file" to the entry name (step 624). The custom class loader then determines whether there are more enumerated files (step 626).

Referring back to step 610, if the entry does have a version number, then custom class loader determines whether the entry name contains the requested name (step 614). If the entry name does not contain the requested name, then the entry name cannot be a version of the requested file and the custom class loader proceeds to determine whether there are more files to enumerate (step 626). If the entry name does include the requested file name, then the custom class loader extracts the current, beginning and ending version numbers for the entry (step 616). The custom class loader then compares the current version number of the variable "found version" to determine if the current version is greater than "found version" (step 618). If the current version of the entry is not greater than the value of "found version", then the current version is not as recent as the found version and the custom class loader proceeds to determine whether there are more enumerated files to check (step 626).

If the current version is greater than the value of "found version", then the custom class loader determines whether the value of the variable "find version" is greater than or equal to the beginning version of the entry and if less than or equal to the ending version of the entry (step 620). If this conditions is satisfied, then the custom class loader sets the value of the variable "find version" to the current version (step 622) and then sets the value of the variable "found file" to the entry name of the currently examined file (step 624). The custom class loader then determines whether there are more files to enumerate (step 626). If more files are present to enumerate, then the custom class loader starts at step 610 and repeats the process to determine whether there is a more current version of the file that that is compatible with the version of the requesting application.

If the condition in step 620 is not satisfied, then the custom class loader determines whether more files are present to enumerate (step 626). If there are more files present, then the custom class loader continues from step 610 as before. However, if there are no more files to enumerate, then class loader 352 determines whether there is an entry for "found file" (step 628). If there is no entry, then an exception is returned to the requesting application (step 632). If there is an entry for the variable "file found", then return the bytes in the database for the found file to the requesting application (step 630).

As indicated in the description of the present invention, the present method may be used to return a file based on versions, such as, for example, a version of a data file, rather than a class. However, since data files do not implement the ClassVersion interface, they must be loaded into the database by a program. The current, begin, and end version numbers for the data files must be supplied by this program.

Each time a class or file is requested from the database, the correct version must be computed. This solution can be made more efficient by caching the file names in a hashtable. The key would be the version number plus the file name (i.e., "xxxxFileName"), and the entry would be the fully qualified name of the file (i.e., "+xxxyyyzzzFileName").

The operation of searching for an appropriate file based on version requires a noticeable amount of CPU resources. To speed up the process, valid files can be cached in a hashtable so that future requests for the file do not have to repeat the costly search operation. In addition, when a version is no longer needed, its associated classes and files can be removed to improve space and efficiency.

Thus, the present invention provides a method for JAVA aplications to dynamically select and load classes or data files base upon version information. It efficiently selects and load classes or file from multiple versions for the currently exucuting JAVA application or class. Furthermore, the present invention enables multiple version of an application to be efficiently installed and used on a computer. Significant benefits result using the mechanism of the present invention.

First, many times only a few files or classes change from one version of an application to another. Normally, if both of these versions are installed on the same computer, the versions of the files or classes must be located in different directories. This method, however, results in many duplicate files that consume additional disk space. The mechanism of the present invention eliminates the need for this duplicate space by requiring that only unique classes or files need be stored in the file systems or database.

Another benefit ko fthe present invention involves web application, which consist of many JAVA classes that are deployed on web servers. Once a set of customers begin using an application, system administrators prefer not to update the appliction unless thoroughly tested. By applying the mechanism of the present invention to the loading of classes based upon the web application and version, then any number of additional test or beta versions can be managed without affecting customer. Once teasting has completed, then the new version can be made available, If the upgrade requires software to be downloaded and installed on a client system, some customers may not want an upgrade. Utilizing the mechanism of the present invention, these customers can continue to run the same version while others upgrade. Thus, with the present invention, bothe customer sets can be effectively suppoted.

For example, during the development of a JAVA install toolkit (installer) that had a system-wide uninstall program, a versioning problem was dicovered. As used herein, the term install toolkit or installer also includes the uninstaller and the term installll operation also includes the uninstall operation. Thus, the install tollkit when running the install operation may install or uninstall a program depending on choices indicated by a user.

When running the install program (in uninstall mode) to remove programs installed with an earlier version of the install toolkit, JAVA exceptions were encountered. These exceptions were due to incompatibilities between classes in the current and earlier versions. The present invention is used to solve the incompativility problem by allowing the install program to dynamically select the appropriate JAVA class and/or data file.

As discussed above, the present invention can also be applied to any software program comprised of multiple files where a subset of the files are incompatible. For example, if a centralized database or repository store all the versions of an application, the present invention would allow JAVA program to change the version it is running under and dynamically load the correct JAVA classes for that version.

It should be noted that while the present application has been described primarily with reference 20 to classes and files that are appropriate for a continuous range of versions, the classes and files may also be appropriate for a discontinuous plurality of versions. For example, a class or file could indicate that it is compatible with versions 1–3, 7–10, 11, and 13.

It should also be noted that, although the present invention has been described primarily with reference to JAVA, the present invention may be applied to other object oriented programming languages as well. An example of another object oriented programming language to which the present invention may be applied is C++.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of installing and uninstalling versions of an application, comprising the steps of:

responsive to a request to install an application, determining a version number of the application and a set of components for the application;

for each of the components, finding a version of the component appropriate for the version number of the application wherein the version of at least one component is appropriate for a plurality of versions of the application and is stored uniquely in a computer;

executing the install operation using the appropriate versions of the components;

determining an appropriate version of an installer for the application, wherein the installer includes a set of components;

determining the appropriate versions of the set of components of the installer according to the version number of the application; and dynamically selecting the appropriate components to form the appropriate version of the installer to execute the install operation.

2. The method as recited in claim 1, wherein the components are classes in an object oriented program.

3. The method as recited in claim 1, wherein the install operation is an uninstall operation.

4. The method as recited in claim 1, wherein the plurality of versions comprise a range of versions.

5. The method as recited in claim 1, wherein the installer is an uninstaller.

6. A method in a data processing system for loading a correct version of a file, comprising the steps of:

receiving a request to load a file, wherein the request includes an indication of the current version of the requesting application; and retrieving and loading one of a plurality of files corresponding to the current version, wherein each of the plurality of files includes an indication of a range of versions for which the particular file is compatible, wherein the indication of the range of versions is expressed as an identification of a lowest compatible version and a highest compatible version, and wherein the current version is within the range of versions for which the one of the plurality of files is compatible.

7. The method as recited in claim 6, wherein the current version is retrieved and loaded by a class loader operating within a JAVA Virtual Machine.

8. The method as recited in claim 6, wherein the file is a class file.

9. A method in a data processing system for loading an application, the method comprising:
   responsive to a request to load the application, identifying a version identifier for the application and a component for the application;
   for a component within the set of components, identifying a version of the component from a set of versions to form am identified version, wherein the identified version is appropriate for a range of version identifiers including the version identifier, wherein the range of identifiers is expressed within the data processing systems as an identification of a lowest compatible version identifier and a highest compatible version identifier; and
   loading the identified version.

10. The method as recited in claim 9, wherein the application includes additional components and wherein the identifying step is performed for each of the additional components.

11. The method as recited in claim 9, wherein the component is a class file.

12. A computer, comprising:
   a processing unit coupled to a bus;
   a memory unit coupled to the bus;
   a class loader object residing in the memory, wherein the class loader object, responsive to a request from a requesting application to load a file, dynamically selects the appropriate version of the file, from a range of versions of the file based on a version of the requesting application, wherein the range of versions is expressed within the computer as an identification of a lowest compatible version and a highest compatible version, and wherein the file is appropriate for a plurality of versions of the application.

13. The computer as recited in claim 12, wherein the appropriate version is compatible with a range of versions of requesting applications and the current version of the requesting application is within the range of versions with which the appropriate version is compatible.

14. The computer as recited in claim 12, wherein the current version of the requesting application is a first version of the requesting application and wherein the class loader object, responsive to a request from a second version of the requesting application, selects, from a plurality of versions of the file, the appropriate version of the file that is compatible with the second version of the requesting application.

15. The computer as recited in claim 12, wherein the appropriate version is loaded into the memory unit.

16. The computer as recited in claim 12, wherein the file is a class.

17. The computer as recited in claim 12, wherein the class loader is compatible with an object oriented programming language.

18. The computer as recited in claim 16, wherein the object oriented programming language is JAVA.

19. The computer as recited in claim 16, wherein the object oriented programming language is C++.

20. The computer as recited in claim 12, wherein the class loader resides within a JAVA Virtual Machine.

21. A computer program product in computer readable media for use in a data processing system for installing and uninstalling versions of an application, the computer program product comprising:
   first instructions, responsive to a request to install an application, for determining a version number of the application and a set of components for the application;
   second instructions, for each of the components, for finding a version of the component appropriate for the version number of the application wherein the version of at least one component is appropriate for a plurality of versions of the application and is stored uniquely in a computer;
   third instructions for executing the install operation using the appropriate versions of the components
   fourth instructions for determining an appropriate version of an installer for the application, wherein the installer includes a set of components;
   fifth instructions for determining the appropriate versions of the set of components of the installer according to the version number of the application; and
   sixth instructions for dynamically selecting the appropriate components to form the appropriate version of the installer to execute the install operation.

22. The computer program product as recited in claim 21, wherein the components are classes in an object oriented program.

23. The computer program product as recited in claim 21, wherein the install operation is an uninstall operation.

24. The computer program product as recited in claim 21, wherein the plurality of versions comprise a range of versions.

25. The computer program product as recited in claim 21, wherein the installer is an uninstaller.

26. A computer program product in computers readable media for use in a data processing system for loading a correct version of a file, comprising the steps of:
   first instructions for receiving a request to load a file, wherein the request includes an indication of the current version of the requesting application; and
   second instructions for retrieving and loading one of a plurality of files corresponding to the current version, wherein each of the plurality of files includes an indication of a range of versions for which the particular file is compatible, wherein the indication of a range of versions for which the particular file is compatible is expressed as an identification of a lowest compatible version and a highest compatible version, and wherein the current version is within the range of versions for which the one of the plurality of files is compatible.

27. The computer program product as recited in claim 26, wherein the current version is retrieved and loaded by a class loader operating within a JAVA Virtual Machine.

28. The computer program product as recited in claim 26, wherein the file is a class file.

29. A computer program product in computer readable media for use in a data processing system for loading an application, the computer program product comprising:
   first instructions, responsive to a request to load the application, for identifying a version identifier for the application and a component for the application;
   second instructions, for a component within the set of components, for identifying a version of the component from a set of versions to form an identified version, wherein the identified version is appropriate for a range of version identifiers including the version identifier, and wherein the range of identifiers is expressed within the data processing systems as an identification of a lowest compatible version identifier and a highest compatible version identifier; and
   third instructions for loading the identified version.

30. The computer program product as recited in claim 29, wherein the application includes additional components and wherein the first instructions are performed for each of the additional components.

31. The computer program product as recited in claim 29, wherein the component is a class file.

32. A system for installing and uninstalling versions of an application, comprising:

means, responsive to a request to install an application, for determining a version number of the application and a set of components for the application;

means, for each of the components, for finding a version of the component appropriate for the version number of the application wherein the version of at least one component is appropriate for a plurality of versions of the application and is stored uniquely in a computer;

means for executing the install operation using the appropriate versions of the components;

means for determining an appropriate version of an installer for the application, wherein the installer includes a set of components;

means for determining the appropriate versions of the set of components of the installer according to the version number of the application; and means for dynamically selecting the appropriate components to form the appropriate version of the installer to execute the install operation.

33. The system as recited in claim 32, wherein the components are classes in an object oriented program.

34. The system as recited in claim 32, wherein the install operation is an uninstall operation.

35. The system as recited in claim 32, wherein the plurality of versions comprise a range of versions.

36. The system as recited in claim 32, wherein the installer is an uninstaller.

37. A system for loading a correct version of a file, comprising:

means for receiving a request to load a file, wherein the request includes an indication of the current version of the requesting application; and means for retrieving and loading one of a plurality of files corresponding to the current version, wherein each of the plurality of files includes an indication of a range of versions for which the particular file is compatible, wherein the indication of the range of versions is expressed as an identification of a lowest compatible version and a highest compatible version, and wherein the current version is within the range of versions for which the one of the plurality of files is compatible.

38. The system as recited in claim 37, wherein the current version is retrieved and loaded by a class loader operating within a JAVA Virtual Machine.

39. The system as recited in claim 37, wherein the file is a class file.

40. A system for loading an application, comprising:

means, responsive to a request to load the application, for identifying a version identifier for the application and a component for the application;

means, for a component within the set of components, for identifying a version of the component from a set of versions to form an identified version, wherein the identified version is appropriate for a range of version identifiers including the version identifier, wherein the range of identifiers is expressed within the data processing systems as an identification of a lowest compatible version identifier and a highest compatible version identifier; and means for loading the identified version.

41. The system as recited in claim 40, wherein the application includes additional components and wherein the identifying step is performed for each of the additional components.

42. The system as recited in claim 40, wherein tthe component is a class file.

* * * * *

UNITED STATES PATENT AND TRADEMARK OFFICE
CERTIFICATE OF CORRECTION

PATENT NO. : 6,826,750 B1  
DATED : November 30, 2004  
INVENTOR(S) : Curtis et al.

Page 1 of 1

It is certified that error appears in the above-identified patent and that said Letters Patent is hereby corrected as shown below:

Column 1,  
Line 15, after "C++ is another" and insert -- example --.  
Line 43, after "written in" delete "object" and insert -- object-oriented --.

Column 4,  
Line 64, after "(JIT)." insert a return and start a new paragraph:  
-- A JVM loads class files and executes the byte codes within them. --.

Column 5,  
Line 34, after "indicate the" delete "nex" and insert -- next --.  
Line 46, after "364" insert -- and JAVA stacks 366 --.  
Line 46, after "combined." insert a return and start a new paragraph:  
-- Method area 370 contains class data while heap 372 --.  
Line 65, after "respect" delete "of" and insert -- to --.

Column 9,  
Line 13, after "benefit" delete "ko fthe" and insert -- of the --.  
Line 14, before "which" delete "application" and insert -- applications --.

Column 11,  
Line 10, after "form" delete "am" and insert -- an --.

Column 12,  
Line 28, after "product in" delete "computers" and insert -- computer --.

Signed and Sealed this

Sixteenth Day of May, 2006

JON W. DUDAS  
*Director of the United States Patent and Trademark Office*